United States Patent

Beyleveld et al.

[11] 3,852,313
[45] Dec. 3, 1974

[54] NOVEL FLUOROCARBON ACIDS

[75] Inventors: Wilhelmus M. Beyleveld, Whippany; Bryce C. Oxenrider, Florham Park; Cyril Woolf, Morristown, all of N.J.

[73] Assignee: Allied Chemical Corporation, New York, N.Y.

[22] Filed: May 21, 1973

[21] Appl. No.: 362,616

Related U.S. Application Data

[62] Division of Ser. No. 867,371, Oct. 17, 1969, Pat. No. 3,754,026.

[52] U.S. Cl...... 260/404.5, 260/518 A, 260/534 R, 260/534 M, 260/519
[51] Int. Cl. .......................................... C07c 103/32
[58] Field of Search......... 260/518 A, 404.5, 534 R, 260/534 M

[56] References Cited
UNITED STATES PATENTS
3,697,562 10/1972 Beyleveld et al. .............. 260/518 A Primary Examiner—Lorraine A. Weinberger
Assistant Examiner—L. A. Thaxton
Attorney, Agent, or Firm—Arthur J. Plantamura

[57] ABSTRACT

Novel fluorocarbon amides useful as oil- and water-repellant agents have the formula

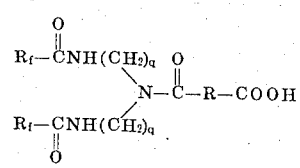

wherein R is an alkyl diradical of one to 12 carbon atoms, an alkylene diradical of two to 12 carbon atoms, or a phenyl diradical; $q$ is an integer from 1 to 6; and $R_f$ is a radical having the formula $$Y(CF_2)_s(CH_2)_t-$$

wherein $s$ is an integer from 1 to 16, $t$ is an integer not greater than $s$ from 0 to 8, with the sum of $s$ plus $t$ being from 1 to 20; and Y is selected from the group consisting of $F_3C-$ and radicals having the formula

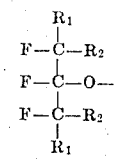

wherein $R_1$ and $R_2$ are fluorine or perfluoroalkyl groups having from one to nine carbon atoms, with not more than three of the $R_1$ and $R_2$ groups being perfluoroalkyl groups.

5 Claims, No Drawings

NOVEL FLUOROCARBON ACIDS

This is a division of application Ser. No. 867,371 filed Oct. 17, 1969, now U.S. Pat. No. 3,754,026.

This invention relates to novel fluorocarbon derivatives useful as oil- and water-repellent agents.

Compounds having the formula

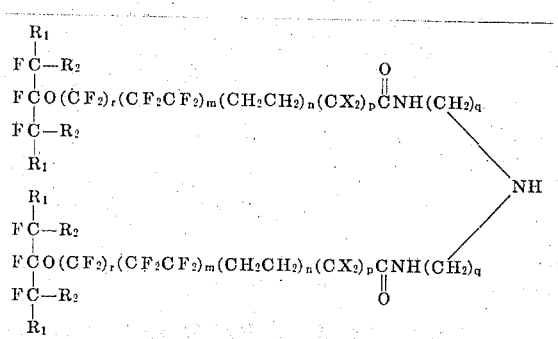

wherein i. $R_1$ and $R_2$ are fluorine or fluoroalkyl groups, or, when taken together, are fluoroalkylene groups forming a cycloaliphatic structure, the $R_1$ and $R_2$ groups each having from one to nine carbon atoms, with not more than three of the $R_1$ and $R_2$ groups being fluoroalkyl groups, ii. $m$ and $n$ are each integers of from 0 to 20, with the proviso that the sum of $m$ plus $n$ is from 0 to 20 and provided further that when $r$ is 0, $m$ is at least 1, iii. X is selected from the group consisting of hydrogen and fluorine, with the proviso that when $n$ is greater than 0, then X is always hydrogen, iv. $p$ is 0 or 1, v. $r$ is 0 or 1, with the proviso that when the sum of $m$, $n$ and $p$ is greater than 0, then $r$ is always 0, and vi. $q$ is an integer from 1 to 6 are disclosed in Canadian patent application Ser. No. 49,650, filed Apr. 24, 1969. The compounds are described in said application as being useful to impart oil repellency to textile materials. Said application further recites that the compounds are applied to the material to be rendered oil repellent by treating the material with a solution of the compound and evaporating the solvent. The treated material is then normally cured or "heat-set" at elevated temperatures.

An improved method of imparting oil repellency to textile materials is disclosed in Canadian patent application Ser. No. 83,977, filed concurrently herewith. That application discloses compositions of synthetic resins having incorporated therein an additive which imparts oil- and water-repellency directly to fibers extruded from the composition. The additives which are suitable for use in the invention of Canadian application Ser. No. 83,977 must meet certain stringent requirements in addition to being capable of imparting oil- and water-repellency to the extruded fiber. The additives must be thermally stable and nonfugitive at the temperature at which the fibers are extruded. A further requirement is that the additive must be dispersible in the resin to which it is added. In developing the invention of application Ser. No. 83,977, it was found that the compounds of application Ser. No. 49,650 generally do not meet these requirements and hence are not suitable for use in the invention of application Ser. No. 83,977.

It is an object of this invention to provide derivatives of the compounds of application Ser. No. 49,650 suitable for use in the invention of application Ser. No. 83,977.

It is a further object of this invention to provide such derivatives which are suitable for use as conventional oil-repellent agents.

SUMMARY OF THE INVENTION

This invention provides a class of novel fluorocarbon compounds having the formula

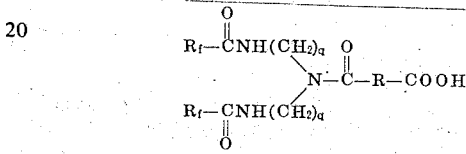

wherein R is an alkyl diradical of one to 12 carbon atoms, an alkylene diradical of two to 12 carbon atoms, or a phenyl diradical; $q$ is an integer from 1 to 6; and $R_f$ is a radical having the formula $$Y(CF_2)_s(CH_2)_t-$$

wherein $s$ is an integer from 1 to 16, $t$ is an integer not greater than $s$ from 0 to 8, with the sum of $s$ plus $t$ being from 1 to 20; and Y is selected from the group consisting of $F_3C-$ and radicals having the formula

wherein $R_1$ and $R_2$ are fluorine or perfluoroalkyl groups each having from one to nine carbon atoms, provided that not more than three of the $R_1$ and $R_2$ groups are perfluoroalkyl groups. $R_1$ and $R_2$ together can form a cycloaliphatic structure.

As oil-repellent agents, the compounds of this invention have certain advantages over oil-repellent agents known to the art and, in particular, over the triazaalkane compounds from which the compounds of this invention are derived. The compounds of this invention are less volatile and in general are otherwise more thermally stable than the corresponding triaza compounds.

The compounds of this invention are also characterized in having the two perfluoroalkyl groups pendant from an organic radical having a terminal carboxyl group. The functional carboxyl group enhances the compatibility of the compound with the substrate to which it is applied without detracting from the oil-repellency provided by the perfluoroalkyl groups. For example, fluoroalkyl groups are notoriously repellent in nature, but this repellency, which is valuable in imparting oil-repellency to a system, must be compensated for in order to incorporate the fluoroalkyl groups into the system. The hydrocarbon portion of the molecule, enhanced by the presence of the functional carboxyl group, serves to orient the molecule to the substrate while leaving the two fluoroalkyl "tails" free to extend from the surface of the substrate and perform their function of repellency. This feature of the compounds of this invention makes them especially valuable as additives which can be incorporated directly into a synthetic resin, which can then be extruded as a fiber having oil- and water-repellency. By this method, the additive is incorporated into the resin in conventional manner, i.e., either by dry or melt blending, in an amount of about 1 percent, followed by extrusion of the resin into filament in accordance withh conventional methods. The triazaalkane compounds from which the compounds of this invention are derived are generally not suitable for use in this method of imparting oil repellency to synthetic fibers.

The compounds of this invention can also be employed as conventional oil and water repellents and can be applied to substrat in accordance with known methods.

The compounds of this invention are prepared by reacting a triazaalkane having the formula $$R_fCNH(CH_2)_qN(CH_2)_qNHCR_f$$
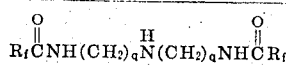

wherein $R_f$ and $q$ have the meanings given for the compounds of this invention, with a cyclic anhydride having the formula

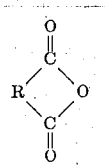

wherein R has the meaning given for the compounds of this invention.

The reaction is carried out in any solvent which is capable of dissolving the reactants and which is inert with respect to the reactants and the product. Most customarily employed organic solvents, such as acetone, are suitable. The reaction can be carried out at temperatures ranging from room temperature up to 200°C, preferably from room temperature to 100°C. Lower temperatures can be used if desired.

The cyclic anhydride reactants are well known materials. The triaza reactants are readily prepared by reacting a lower alkyl ester of an acid having the formula $R_fCOOH$ with an amine having the formula $NH_2(CH_2)_qNH(CH_2)_qNH_2$, wherein $R_f$ and $q$ have the meanings given for the compounds of this invention. Esters derived from acids having the formula $R_fCOOH$ wherein the "Y" group of the $R_f$ component is $F_3C-$ are well known materials and can be made from the acids, which are generally available commercially. Acids wherein "Y" has the formula

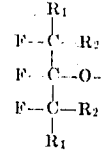

can be prepared from a telomer halide having the formula

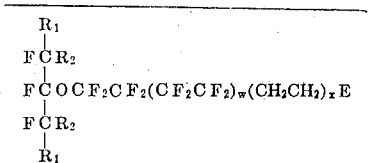

wherein $R_1$ and $R_2$ have the afore-stated meanings, $w$ and $x$ are integers indicating the respective degrees of telomerization, and E is bromine or iodine. These telomer halides and their method of preparation are described in U.S. Pat. No. 3,514,487, corresponding to Canadian application Ser. No. 15,771 filed Mar. 25, 1968. The telomer halides are prepared by reacting telogens of the formula

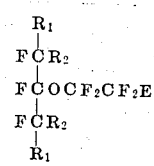

with telomerizable unsaturated compounds, i.e., tetrafluoroethylene and ethylene, the reaction being initiated by heat or free radical catalyst. The telogens are prepared by reacting the corresponding perfluorinated ketone with an ionizable fluoried salt, e.g., CsF, to form the corresponding organic salt, and then reacting the organic salt with tetrafluoroethylene and either bromine or iodine. Preparation of the telogens is described in greater detail in Canadian Pat. No. 789,593, corresponding to U.S. Pat. No. 3,453,333.

Acids having the formula

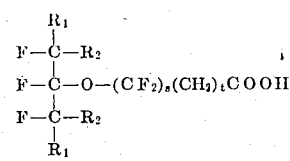

wherein $t$ is 0 can be prepared by reacting the corresponding telomer halide with ICN or $(CN)_2$ at pressures above 20 atmospheres and at temperatures above 300°C to form the nitrile, followed by hydrolysis of the nitrile in accordance with conventional methods to form the acid. Acids wherein $t$ is greater than zero can be prepared by reacting the corresponding telomer halide with an alkali metal cyanide in the presence of dimethyl sulfoxide at temperatures between 60° and 100°C to form the nitrile, from which the acid can be prepared in accordance with conventional methods.

The acid can also be prepared (regardless of whether $t$ is 0 or greater) by reacting the telomer halide with sulfur trioxide, followed by hydrolysis of the reaction product to obtain the acid. By this method, the acid contains one less carbon atom than the telomer halide from which it was prepared. Also, the acid thus formed can be converted to the corresponding telomer iodide for further telomerization by reaction with alkali-free silver oxide to form the silver salt, followed by reaction of the silver salt with powdered iodine to form the telomer iodide. By this method, acids having either an odd or even number of hydrocarbyl or fluorocarbyl groups can be prepared.

DESCRIPTION OF THE PREFERRED EMBODIMENTS

The preferred compounds of this invention have the formula

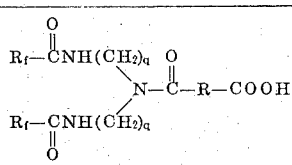

wherein R is an alkyl diradical of one to eight carbon atoms, an alkylene diradical of two to eight carbon atoms, or a phenyl diradical; $q$ is 2; and $R_f$ is a radical having the formula $$Y(CF_2)_s(CH_2)_t-$$

wherein $s$ is an integer from 2 to 10; $t$ is an integer not greater than $s$ from 0 to 4; and Y is selected from the group consisting of $F_3C-$ and radicals having the formula

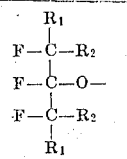

wherein $R_1$ and $R_2$ are fluorine or perfluoroalkyl groups having from one to two carbon atoms. In especially preferred embodiments of this invention, $R_1$ and $R_2$ are fluorine, $s$ is 2 to 5, and $t$ is 0 to 2.

The following examples further illustrate the invention. In each example the product was identified by elemental and infrared spectrum analyses.

EXAMPLE 1

To a flask containing a solution of 1.5 grams of glutaric anhydride in 10 ml of acetone, there was added a solution of 8.9 grams of 1,7-bis(perfluorooctanoyl)-1,4,7-triazaheptane in 40 ml of acetone. The reaction mixture was stirred at room temperature for 4 hours, then allowed to stand overnight. The precipitate which had formed was recovered by filtration and washed with acetone. Additional reaction product was obtained by adding water to the mother liquor and recovering by filtration the product which formed. A total of 9.7 grams of product, melting point 139°–141°C, were recovered. The product was identified as having the following structure

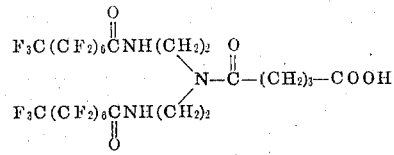

EXAMPLE 2

A flask was charged with 250 ml of acetone and 60.4 grams of 1,7-bis(perfluoroisopropoxybutyryl)-1,4,7-triazaheptane, which has the formula $$[(CF_3)_2CFO(CF_2)_3CONH(CH_2)_2]_2NH$$

To this was added a solution of 8.35 grams of glutaric anhydride in 100 ml of acetone. The reaction mixture was stirred at 50°C for 1 hour, then cooled and diluted with water. The reaction product separated as a heavy oily layer, which was dissolved in ether, washed in water, and dried. The product, obtained at about 100 percent yield, was a waxy solid, melting point 80°C. The product was identified as 1,7-bis(perfluoroisopropoxybutyryl)-1,4,7-triazaheptane monoglutaramide.

EXAMPLE 3

To a solution of 25 grams of 1,7-bis(perfluoroisopropoxybutyryl)-1,4,7-triazaheptane in 100 ml of acetone there was added a solution of 3.0 grams of succinic anhydride in 30 ml of acetone. The reaction mixture was refluxed for 2 hours, then cooled and diluted with water. The reaction product separated as an oily layer, which was recovered and dried. The yield was 93 percent. The product has a melting point of 90–95°C and was identified as 1,7-bis(perfluoroisopropoxybutyryl)-1,4,7-triazaheptane monosuccinamide.

EXAMPLE 4

The procedure of Example 3 was repeated, except maleic anhydride was substituted for the succinic anhydride. The product, melting point 45°–50°C, had the following structure $$[(CF_3)_2CFO(CF_2)_3CONH(CH_2)_2]_2NCOCH=CH-COOH$$

EXAMPLE 5

The procedure of Example 3 was repeated, except phthalic anhydride was substituted for the succinic anhydride. The product, melting point 65°–75°C, was identified as 1,7-bis(perfluoroisopropoxybutyryl)-1,4,7-triazaheptane monophthalamide.

Example 6

To a solution of 25.7 grams of 1,7-bis(perfluoroisopropoxyhexanoyl)-1,4,7-triazaheptane in 100 ml of acetone was added a solution of 2.86 grams of glutaric anhydride in 50 ml of acetone. The reaction mixture was refluxed for 1 hour, then cooled and diluted with water. The reaction product settled out as an oil which solidified. The product was recovered by filtration, washed with water, ground and then dried under vacuum. A total of 27.2 grams of product, melting point 93°C, were recovered. The product was identified as 1,7-bis(perfluoroisopropoxyhexanoyl)-1,4,7-triazaheptane monoglutaramide. The product was heated up to 220°C without loss in weight.

EXAMPLE 7

To a solution of 16.3 grams of the compound [(CF$_3$)$_2$CFO(CF$_2$)$_4$(CH$_2$)$_2$CONH(CH$_2$)$_2$]$_2$NH in 70 ml of acetone was added a solution of 2 grams of glutaric anhydride in 30 ml of acetone. The reaction mixture was refluxed for 1 hour, allowed to stand overnight and diluted with water. The reaction product settled out as a sludge, which was recovered by decanting off the supernatant liquid. The product was extracted with acetone, which was subsequently evaporated off, leaving 13.6 grams of residue. The residue was combined with ether, in which it was not soluble, and filtered. A total of 13.1 grams of product were recovered. The product had the following structure

[(CF$_3$)$_2$CFO(CF$_2$)$_4$(CH$_2$)$_2$CONH(CH$_2$)$_2$]$_2$NCO(CH$_2$)$_3$COOH

We claim:
1. Compounds having the formula

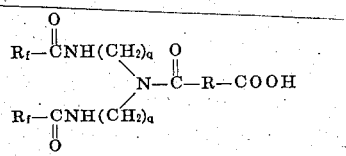

wherein R is an alkyl diradical of one to 12 carbon atoms an alkylene diradical of two to 12 carbon atoms, or a phenyl diradical; $q$ is an integer from 1 to 6; and R$_f$ is a radical having the formula Y(CF$_2$)$_s$(CH$_2$)$_t$ wherein $s$ is an integer from 1 to 16, $t$ is an integer not greater than $s$ from 0 to 8, with the sum of $s$ plus $t$ being from 1 to 20; and Y is selected from the group consisting of F$_3$C— and radicals having the formula

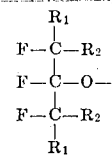

wherein R$_1$ and R$_2$ are fluorine or perfluoroalkyl groups each having from one to nine carbon atoms, provided that not more than three of the R$_1$ and R$_2$ groups are perfluoroalkyl groups.

2. The compounds of claim 1 wherein R is an alkyl diradical of one to eight carbon atoms an alkylene diradical of two to eight carbon atoms, or a phenyl diradical, $q$ is 2; s is an integer from 2 to 10; $t$ is an integer not greater than $s$ from 0 to 4; and Y is selected from the group consisting of F$_3$C— and radicals having the formula

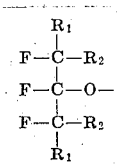

wherein R$_1$ and R$_2$ are fluorine or perfluoralkyl groups having from one to two carbon atoms.

3. The compounds according to claim 2 wherein R$_f$ is CF$_3$(CF$_2$)$_6$—.

4. The compounds of claim 2 wherein R$_1$ and R$_2$ are fluorine.

5. The compounds of claim 4 wherein $s$ is 2 to 5 and $t$ is 0 to 2.

* * * * *

UNITED STATES PATENT OFFICE
CERTIFICATE OF CORRECTION

Patent No. 3,852,313　　　　Dated December 3, 1974

Inventor(s) Wilhelmus M. Beyleveld, Bryce C. Oxenrider and Cyril Woolf

It is certified that error appears in the above-identified patent and that said Letters Patent are hereby corrected as shown below:

Claim 1, column 7, lines 35-37, delete "an alkyl diradical of one to 12 carbon atoms an alkylene diradical of two to 12 carbon atoms, or a phenyl diradical" and substitute therefor -- a phenylene group --.

Claim 2, column 8, lines 17-20, delete "R is an alkyl diradical of one to eight carbon atoms an alkylene diradical of two to eight carbon atoms, or a phenyl diradical,".

Column 8, line 43, add the following claim:

-- 6. The compound of claim 1 wherein Y has the formula

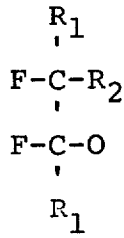

wherein s is an integer from 1 to 16, t is an integer not greater than s from 0 to 8, with the sum of s plus t being from 1 to 20, and $R_1$ and $R_2$ are fluorine or perfluoroalkyl groups each having from 1 to 9 carbon atoms, provided that not more than three of the $R_1$ and $R_2$ groups are perfluoroalkyl groups. --

Signed and Sealed this sixteenth Day of December 1975

[SEAL]

Attest:

RUTH C. MASON  
Attesting Officer

C. MARSHALL DANN  
Commissioner of Patents and Trademarks